Figure 1:
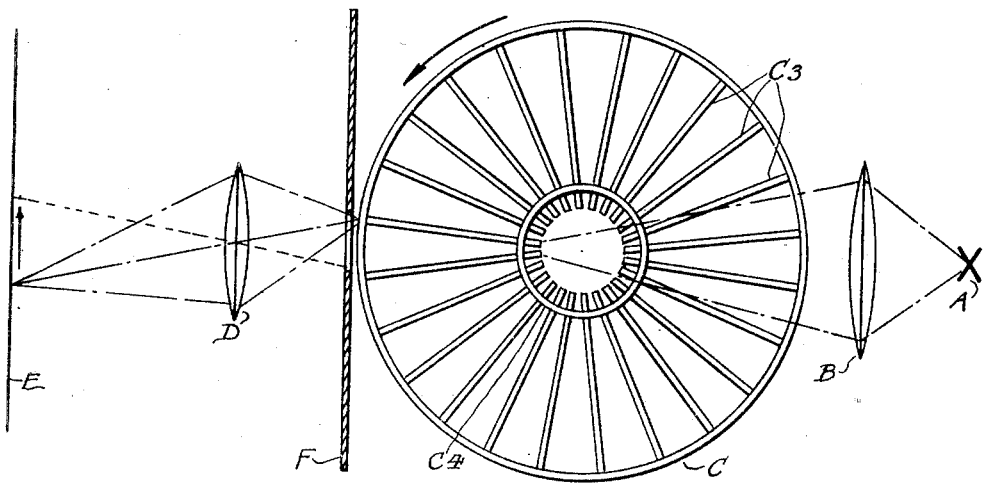

Feb. 9, 1932.                C. F. JENKINS                1,844,508
                      SCANNING APPARATUS AND METHOD
                            Filed Jan. 14, 1930

Charles Francis Jenkins
INVENTOR

BY Darby & Darby
His ATTORNEYS

Patented Feb. 9, 1932

1,844,508

UNITED STATES PATENT OFFICE

CHARLES FRANCIS JENKINS, OF WASHINGTON, DISTRICT OF COLUMBIA, ASSIGNOR TO JENKINS LABORATORIES, OF WASHINGTON, DISTRICT OF COLUMBIA, A CORPORATION OF THE DISTRICT OF COLUMBIA

SCANNING APPARATUS AND METHOD

Application filed January 14, 1930. Serial No. 420,672.

This invention is in the art of television and relates to means for scanning subjects to be broadcast by radio, by wire, or the like, and has for its principal object mechanism which permits the employment of a high-intensity arc lamp as the source of spot-light scanning.

Two schemes for scanning are in common use; (1) illuminating the subject completely all the time, and (2) illuminating the subject with a single spot of light swept across the subject in successive parallel adjacent lines.

The latter method is far to be preferred, for the person, or subject, is then swept with a spot of light which remains in no one place on the subject's face long enough to cause discomfort, and resultant frowning. Therefore, although the spot may be of such a high-intensity as to be dangerous if the spot were applied without movement for even a brief interval, its constant motion prevents any hazard, the subject senses only a soft glow of light, the average of what would be a momentary application between relative long intervals of no illumination.

An arc lamp is readily available, obviously, but to impinge the arc crater spot on a subject, located at some distance, without serious loss of light due to the inverse square law is a difficult problem, especially so when the spot must be put in motion.

The principal object of this invention is, therefore, to provide a method of illuminating or scanning a subject, object or visual representation by a moving light spot derived from a source of high-intensity, such as an arc lamp, and transmitted with a minimum of loss due to the inverse-square law.

Another object of the invention is to provide a method of conducting light from a concentrated area to provide an extremely high-intensity light spot and, at the same time, moving said spot with great rapidity over a subject, object or other visual representation.

A feature of the invention relates to a scanning mechanism suitable for illuminating a subject or object by point-reflection, employing a rotary drum-type scanner between the scanning light source and the subject or object to be scanned, said scanner being provided with means for conducting light in sharp and well defined boundaries in a direction towards the subject or object.

A further feature of the invention resides in the method and means for employing a scanning device of the type disclosed in U. S. Patent 1,683,137, for illuminating a subject, object or visual representation to be transmitted by television or similar systems.

Other features and advantages of the invention, not specifically enumerated, will be apparent after a consideration of the following detailed descriptions and the appended claims.

While the invention will be disclosed in connection with one specific organization and arrangement of elements of known type, it will be understood that this is done merely for the purposes of explaining the inventive concept. Furthermore, only sufficient parts of a television system embodying the invention are disclosed to enable the invention to be clearly understood.

Figure 2:
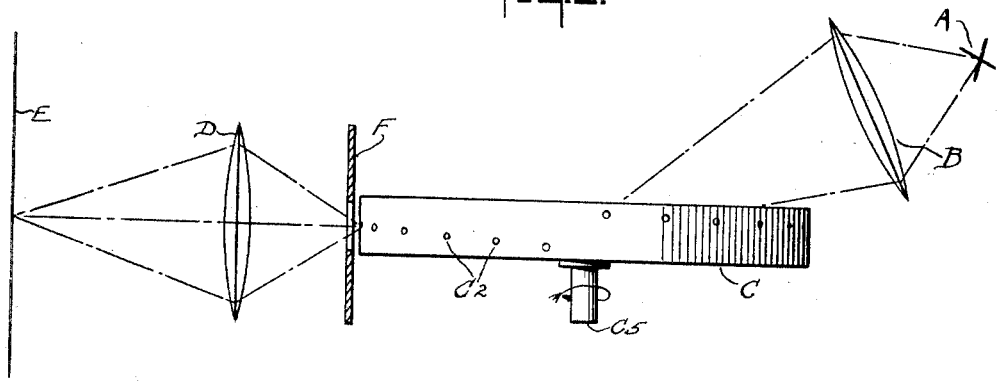

In the drawings, Figure 1 is a top view of a schematic lay-out, and Figure 2 an elevation thereof. In the figures, A is a light source, preferably an arc lamp, although not necessarily so, since any equivalent high-intensity and readily available light source of corresponding high efficiency, may be employed; B is a collecting or condenser lens; C is a shallow rotatable drum preferably of the type disclosed in U. S. patent to C. F. Jenkins, No. 1,683,137; D is a projecting lens, and E is a subject or object to be scanned.

The thin rim of C is perforated with a plurality of small apertures, C2, helically arranged. In radial alignment with these apertures are quartz or glass rods, C3, one for each aperture. The rods are shorter than the radius of the drum, and the inner ends are supported in a radial ring C4. The drum is supported and rotated by hub C5 on any suitable means, as a motor shaft, for example, and driven at the required rate of speed by any suitable motive source (not shown).

When the lamp is lighted the diverging light rays from the source A are collected by lens B and directed into the ends of quartz rods C3. It is preferred to focus the light from source A upon the inner ends of not more than two of the rods C3. However, the accuracy of this focus is not absolutely essential since a stationary light baffle may be mounted at the outer ends of the rods, as indicated by the letter F, to define the field of view to be scanned. The light is confined within the walls of the rods and emerges at the outer ends, to be imaged by objective D onto the subject E.

The rotation of the drum causes the image spot to sweep across the subject or object, to be followed by the next in succession. However, as the exit end of each quartz rod is at a different level the lines of travel of the image spot across the subject, or object, are adjacent paths, not in the same path. In effect, therefore, the subject or object is illuminated in successive parallel adjacent linear elements by means of a moving spot of high-intensity and without fringing effects which occur when perforated discs or the like are employed.

The diverging light rays from source A are concentrated by the lens B into each of the rods C3 as they pass the aerial image. The movement of the inner ends of the rods is small compared with the movement of the outer ends, and, therefore, a large amount of the original light intensity is captured in each tube in passing. This is in sharp contrast to the usual method of employing a perforated scanning disc which merely selects a minute section of the total scanning beam which, obviously, must be of a relatively large size in order to cover the requisite field of view. By means of the arrangement disclosed practically the entire quantity of light from source A is conducted through each tube in succession and projected upon the object or subject.

Furthermore, as the outer ends of the rods are moving through a relatively large arc a large spot-movement is generated by the rotation of the drum C. The light at the exit end is, therefore, of great intensity, and is in turn imaged on the subject E with little loss and with the required scanning movement.

With the employment of the two large lenses B and D, each subtending a large light angle, and the moderate size quartz-rod drum, which may turn a multiple number of times to complete the scanning of the subject, the light is carried from light source A to subject E, a considerable distance away without material loss of intensity.

What is claimed is:

1. Scanning apparatus comprising an arc lamp, a rotary device carrying a plurality of separate light conducting rods positioned between said arc lamp and the subject or object to be scanned, means for concentrating and projecting the light from said lamp upon the inner ends of said rods in succession, and means for causing the light emerging from the outer ends of said rods to be imaged upon and to trace successive adjacent strips across the subject or object.

2. The method of scanning a subject with a moving light spot for television transmission, which comprises producing a high and constant intensity light beam, collecting the light from said beam and projecting it upon the inner ends of a plurality of light confining rods, rotating said rods relatively to said beam, collecting the light emerging from the outer ends of said rods, and imaging the collected emergent light upon said subject.

3. In a scanning system for television transmission, the combination of a drum-like member having a plurality of radially disposed light conducting rods, a light source of high and constant intensity situated outside of said drum, an optical system for collecting and projecting the light from said source upon the inner ends of said rods, an optical system adjacent the outer ends of said rods for collecting and imaging the light emergent therefrom upon a subject or object to be scanned.

In testimony whereof I have hereunto set my hand on this 10th day of January, A. D. 1930.

CHARLES FRANCIS JENKINS.